Feb. 20, 1962 J. E. FLAGG ET AL 3,021,844
SEAMLESS MOLDED BRASSIERE CUPS
Filed Jan. 22, 1960

INVENTORS
JOHN E. FLAGG
NORMAN A. CORMIER

*by Charles R. Fay,*

ATTORNEY

United States Patent Office 3,021,844
Patented Feb. 20, 1962

3,021,844
SEAMLESS MOLDED BRASSIERE CUPS
John E. Flagg, Worcester, and Norman A. Cormier, Leicester, Mass., assignors to David Clark Company Incorporated, Worcester, Mass., a corporation of Massachusetts
Filed Jan. 22, 1960, Ser. No. 4,100
2 Claims. (Cl. 128—463)

This invention relates to new and improved thermoplastic seamless molded brassiere cups, and the principal object of the invention is to provide a brassiere having bust cups which give the ultimate in control and comfort but obviate the use of any seam or fold and are smooth and uninterrupted.

Another object of the invention includes the provision of seamless molded brassiere cups including a special new and improved supporting device or stiffener which is incorporated in the brassiere cup in a new and improved manner, i.e., being held between an outer cup-forming part and an inner liner material.

A further object of the invention resides in the provision of a thermoplastic molded bust cup or the like for brassieres, this bus cup being molded in at least two parts including a thermoplastic sheer liner material of very light weight and a lace covering therefor also of thermoplastic material; and the provision of a method of forming the cups by shaping the liner and the lace material smoothly on a bust-shaped form and then heating the same for a certain predetermined period of time in order to set both the liner and the lace material in the desired form according to the shape of the bust form; the provision of the method of making a seamless bust cup as above described including the provision of the step of sealing and cutting the two pieces of material, i.e., the sheer liner and the lace while in place on the form by means of a heated needle or knife so that the two are permanently sealed together at the peripheral edges thereof and are cut to the shape required for application to the brassier body portion itself; and the provision of the method as above stated including the interruption of a portion of the sealed peripheral are at the lower edge of the bust cup for the insertion between the sheer liner and the lace material of a new and improved stiffening means therein, so that the liner still covers the entire inside of the cup.

The invention further relates to arrangements and combinations of parts which will be hereinafter described and more particularly set forth in the appended claims.

Reference is to be had to the accompanying drawings, in which

Figure 1:
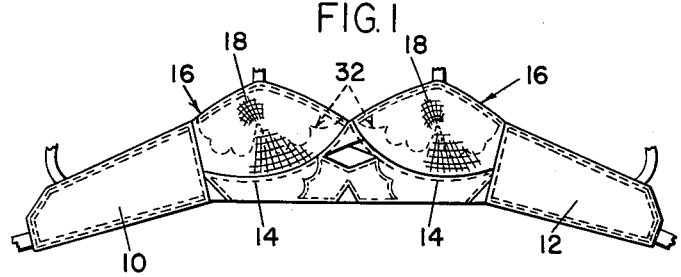
Figure 2:
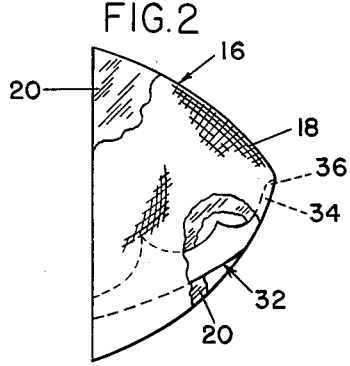
Figure 3:
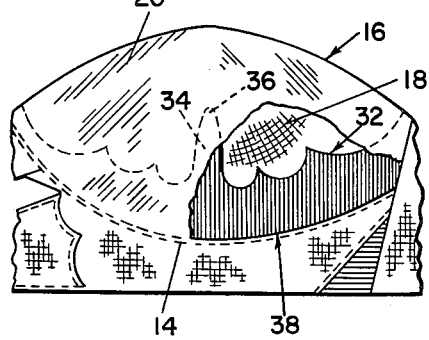
Figure 4:
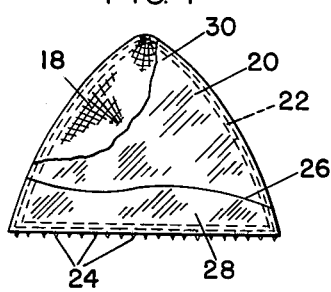
Figure 5:
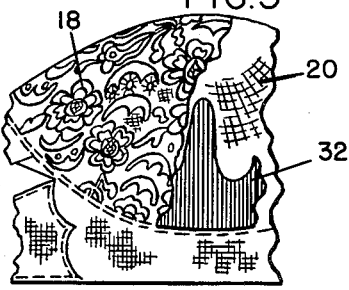

FIG. 1 is a view in elevation showing the invention;
FIG. 2 is a view in side elevation on an enlarged scale showing one of the cups; parts being broken away;
FIG. 3 is a view in front elevation on an enlarged scale showing one of the cups, parts being broken away;
FIG. 4 is a view of the method of molding the cup; and
FIG. 5 is a view similar to FIG. 3, but showing a form of lace utilized in the device.

In carrying out the invention, reference is made to FIG. 1 where there is shown a band or the like at 10 which has the usual fasteners for securement to another band portion 12 in order to attach the brassiere about the person of the user. Conventional shoulder-straps are also provided, and it is to be understood that the present invention may be applied to many different forms and styles of brassiere without departing from the scope thereof, and appropriate seams where necessary outside of the cup portions of the brassiere, elastic inserts, etc. may be utilized as will be clear to those skilled in the art.

The bust cups in the present case are secured to the brassiere material at the peripheral edges thereof by being sewn thereto along such lines as are indicated by the reference numerals 14. The bust cups comprise concave conoidal-shaped members and these are generally indicated by the reference numerals 16.

Each bust cup is made up of two main portions, one of which is an outer ornamental loosely made lace material, and this is indicated at 18. Coextensive in area therewith there is a liner 20 which is made of a very sheer, lightweight, fine woven material as indicated in the drawings. Both the lace and the sheer liner are made of nylon or similar thermoplastic material which is suitable to the manufacture of the brassiere as hereinafter described.

In forming the bust cups themselves, a form indicated at 22 is utilized, this form approximating the final desired shape of the bust cup. The first step of the operation is to apply a flat sheet of sheer nylon liner material to this form 22, smoothing it down and attaching it at the peripheral edges thereof as by means of the prongs 24 which extend along the marginal edge of the form 22 at the base thereof. It is to be understood that in this step of the process, the flat sheet of sheer material is smoothed down until it is seamless and unfolded and unwrinkled in any way but lies completely smoothly on the form. This can be done at room temperature because of the fact that the liner material is very sheer and lightweight, and the individual filaments going to make it up are capable of some motion with respect to each other and also the material is somewhat distortable.

When the sheer liner material has thus been made in shape and conformance to the bust form, the lace material is then superimposed thereon and it is also smoothed down and stretched into position, being fixed about the periphery of the base of the conical shape mold by means of the same prongs 24 as before used for the liner.

When the lace material has been thus smoothed down and is fold and wrinkle-free, and in conformance and shape to the bust mold 22, the mold and the two laminated materials thereon, are placed in an oven or other heating meadium and heated to a required degree for a required length of time. When removed from the heating medium, cooled, and removed from the bust cup, the bust shape of the form is retained in the fabric, whereas if the material were removed from the form without the heating, the liner and lace both would tend to go back to the original flat shape thereof. However, after the heating step in the process, this is not true and the bust cup is formed into the shape desired. Only enough heat is required as to exceed that at which the fabric were originally set in form by the finisher. A lesser heat would not re-set the fabric in the shape of the mold.

However, before removing the laminations of the sheer liner and the lace from the bust cup form, a heated knife or needle is utilized to move along a certain curve of predetermined shape as at 26 to outline the base of the bust cup so that it may be incorporated into the brassiere as for instance in the shape shown in FIGS. 1 and 3 without further trimming, etc. This heated needle also seals the fabrics together at the same time that it severs the waste portion 28 from the bust cup, which is now indicated in FIG. 4 by the reference numeral 30.

Further contemplated in this invention is the provision of an improved stiffener of lunar and ellipsoidal shape which is shown at 32 generally in FIGS. 1, 2 and 3. The improvement in shape in the present case resides in the central elongated pointed portion 34 which underlies the center of the breast as it is held in the brassiere cup, and the tip of the point at 36 extends just to the apex of the cup as is perhaps best seen in FIG. 2. This provides a great improvement in the stiffener or supporting medium for the breast than has heretofore been possible inasmuch as the entire length of the breast is supported but at the same time is substantially free and there is no interference or irritation.

In any event, the new stiffener has the shape best shown in FIG. 3, and in cases where the liner 20 has been completely sealed all around the bust mold, it is now cut along an edge corresponding to that which is indicated by the reference numeral 38 in FIG. 3 for the insertion thereinto of the stiffener between the liner and the lace material and then the pieces are re-connected together and the stiffener fixed in any way that is found desired or convenient. Of course when the liner and lace materials are cut along line 26, the heat may be removed from the cutting action long enough to provide a slit for the stiffener to be inserted as above described.

This invention is in general an improvement on prior Patent No. 2,760,198 and it has been found that the present method and brassiere is a commercially feasible operation and device, whereas in the patent above described the process used required so much pressure on the fabric that unless a heavy material was used, the material would be burst under the forming operations; and if a heavy enough nylon material were used, it would be uncomfortable and sometimes rippled in effect because of the fact that being heavy, it could not conform exactly to the shape of the mold as was desired.

On the other hand, however, in the present case this difficulty has been done away with by the use of two very light-weight materials, one of which is a sheer, lightweight nylon liner, and the other is the loose lacy material which forms the main portion of the bust cup being backed up however by the liner. The liner at the same time makes the bust cup more comfortable and with the soft sheer material lining the bust cup, a seamless bust cup is provided which is the ultimate in comfort and support, particularly when the new and improved stiffener 32 is used therewith.

As an example of the invention, there is shown in FIG. 5 a form of lace 20 that has been found to provide a practical outer layer for the cup. This lace comprises nylon or similar thermoplastic filaments outlining an ornamental design of ellipses carrying out the elliptic motif of the shape of the stiffening 32. However, any other lacy configuration would also accomplish the purpose of providing seamless cups as described. Except for FIG. 5, the lace and the sheer nylon liner are merely disclosed as fabrics in general. The showing of FIG. 5 however provides a more factual disclosure of the cup.

Having thus described the invention and the advantages thereof, it is not desired to be limited to the details herein disclosed, otherwise than as set forth in the claims, but what is claimed is:

1. A bust cup for brassieres comprising an inner sheer, smooth sheet of uninterrupted, seamless thermoplastic fabric material, an outer thermoplastic lacy sheet, said sheets being in conoidal dome shape, and a generally elliptical bust-supporting panel of relatively stiff material in an edge portion of said shape, said panel being located between the two sheets of material, said panel including a generally central inwardly-extending portion generally at the center of the shape.

2. A bust cup for brassieres comprising a pair of uninterrupted, seamless sheets of thermoplastic fabric material, said sheets being in conoidal dome shape, and a generally elliptical bust-supporting panel of relatively stiff material in an edge portion of said shape, said panel being located between the two sheets of material, said panel including a generally central inwardly-extending portion generally at the center of the shape, said inwardly-extending portion terminating substantially at the apex of the dome.

References Cited in the file of this patent

UNITED STATES PATENTS

| | | |
|---|---|---|
| 2,191,545 | Schneider | Feb. 27, 1940 |
| 2,285,967 | Hardy | June 9, 1942 |
| 2,592,265 | Fyfee | Apr. 8, 1952 |
| 2,604,625 | Gruber | July 29, 1952 |
| 2,646,380 | Barlow et al. | July 31, 1953 |
| 2,752,279 | Alderfer | June 26, 1956 |
| 2,760,198 | Poole et al. | Aug. 28, 1956 |
| 2,854,984 | Rosenthal | Oct. 7, 1958 |

FOREIGN PATENTS

| | | |
|---|---|---|
| 656,197 | Great Britain | Aug. 15, 1951 |